(12) United States Patent
Shionozaki

(10) Patent No.: US 10,673,788 B2
(45) Date of Patent: Jun. 2, 2020

(54) INFORMATION PROCESSING SYSTEM AND INFORMATION PROCESSING METHOD

(71) Applicant: SONY CORPORATION, Tokyo (JP)

(72) Inventor: Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 164 days.

(21) Appl. No.: 15/755,361

(22) PCT Filed: Jul. 8, 2016

(86) PCT No.: PCT/JP2016/070207
§ 371 (c)(1),
(2) Date: Feb. 26, 2018

(87) PCT Pub. No.: WO2017/068816
PCT Pub. Date: Apr. 27, 2017

(65) Prior Publication Data
US 2018/0248819 A1 Aug. 30, 2018

(30) Foreign Application Priority Data
Oct. 20, 2015 (JP) .................................. 2015-206443

(51) Int. Cl.
*G06F 15/16* (2006.01)
*H04L 12/58* (2006.01)
(Continued)

(52) U.S. Cl.
CPC ............ *H04L 51/02* (2013.01); *G06F 3/0482* (2013.01); *G06K 9/00335* (2013.01); *H04L 51/16* (2013.01); *H04M 11/00* (2013.01)

(58) Field of Classification Search
CPC ......... H04L 51/02; H04L 51/16; H04L 51/00; H04L 51/104; H04L 61/6081;
(Continued)

(56) References Cited

U.S. PATENT DOCUMENTS 5,727,950 A * 3/1998 Cook ........................ G09B 5/02
434/350
5,918,222 A * 6/1999 Fukui ...................... G06Q 10/10
(Continued)

FOREIGN PATENT DOCUMENTS

JP          10-222521 A     8/1998
JP       2005-348167 A    12/2005
(Continued)

OTHER PUBLICATIONS

International Search Report dated Sep. 27, 2016, in PCT/JP2016/070207 filed Jul. 8, 2016.

*Primary Examiner* — Thu Ha T Nguyen
(74) *Attorney, Agent, or Firm* — Oblon, McClelland, Maier & Neustadt, L.L.P.

(57) ABSTRACT

[Object] To provide an information processing system and an information processing method to enable an automatic response to be performed with higher affinity in accordance with a mental condition of a user.
[Solution] An information processing system including: a database that accumulates a relationship between a user for which a virtual agent is substituted and a partner user as a communication partner on a network; and a control unit that generates a message in accordance with a mental condition of the partner user and the relationship between the user and the partner user, and sends the message from the virtual agent to the partner user.

18 Claims, 20 Drawing Sheets

(51) Int. Cl.
*H04M 11/00* (2006.01)
*G06F 3/0482* (2013.01)
*G06K 9/00* (2006.01)

(58) Field of Classification Search
CPC ......... H04L 2012/40254; G06F 3/0482; G06F 3/0487; G06F 3/0488; G06F 3/04883; G06F 11/3089; G06F 11/3656; G06F 11/3466; G06F 2203/011; G06K 9/00335; G10L 15/22; G10L 2015/223
USPC .................................................. 709/203, 206
See application file for complete search history.

(56) References Cited

U.S. PATENT DOCUMENTS

| | | | |
|---|---|---|---|
| 6,339,774 B1 | 1/2002 | Nakayama et al. | |
| 6,427,063 B1* | 7/2002 | Cook | G09B 7/00 434/118 |
| 8,762,468 B2* | 6/2014 | Tardelli | H04L 12/6418 709/206 |
| 2003/0158960 A1* | 8/2003 | Engberg | G06Q 20/02 709/237 |
| 2006/0167784 A1* | 7/2006 | Hoffberg | G06Q 20/401 705/37 |
| 2007/0038610 A1* | 2/2007 | Omoigui | H04L 29/06 |
| 2007/0044539 A1* | 3/2007 | Sabol | G06Q 10/06 73/19.01 |
| 2007/0087756 A1* | 4/2007 | Hoffberg | G06Q 10/0631 455/450 |
| 2007/0112912 A1* | 5/2007 | Weber | B65G 47/5122 709/203 |
| 2008/0262982 A1 | 10/2008 | Rajkhowa et al. | |
| 2009/0198834 A1* | 8/2009 | Crow | H04L 67/16 709/245 |
| 2010/0023582 A1* | 1/2010 | Pedersen | H04L 67/34 709/203 |
| 2011/0276396 A1* | 11/2011 | Rathod | G06Q 10/00 705/14.49 |
| 2014/0164305 A1* | 6/2014 | Lynch | G06Q 30/0201 706/46 |
| 2014/0309864 A1* | 10/2014 | Ricci | A61B 5/0077 701/36 |
| 2017/0046496 A1* | 2/2017 | Johnstone | G06Q 50/01 |
| 2017/0293763 A1* | 10/2017 | Shear | G06F 21/64 |
| 2018/0143989 A1* | 5/2018 | Nomula | G06F 16/3329 |
| 2018/0264347 A1* | 9/2018 | Tran | A42B 3/0433 |
| 2019/0251965 A1* | 8/2019 | Dharne | G06F 3/011 |

FOREIGN PATENT DOCUMENTS

| | | |
|---|---|---|
| JP | 2007-295201 A | 11/2007 |
| JP | 2010-205015 A | 9/2010 |
| JP | 2013-61889 A | 4/2013 |

* cited by examiner

FIG. 13

STANDARD bot-RESPONSE TABLE 130

| EMOTION OF PARTNER USER | RELATIONSHIP WITH PARTNER USER | STANDARD bot-RESPONSE |
|---|---|---|
| TIMID | CHILD | "UNDECIDED?" |
| ANXIOUS | LOVER | "WHAT'S UP?" |
| GLAD | CHILD | "DID SOMETHING GOOD HAPPEN?" |

FIG. 15

RELATIONAL INFORMATION ~120

| USER ID | PARTNER USER ID | RELATIONSHIP | bot RESPONSE | SENT MESSAGE | RECEIVED MESSAGE | FREQUENTLY USED KEYWORD |
|---|---|---|---|---|---|---|
| 123 | 456 | PARENT | TABLE 121 | TABLE 122 | TABLE 123 | TABLE 124 |
| 124 | 457 | LOVER | ... | ... | ... | ... |
| 125 | 458 | SPOUSE | ... | ... | ... | ... |

FIG. 16 bot-RESPONSE TABLE 121

| EMOTION OF PARTNER USER | DATE AND TIME | RESPONSE CONTENTS |
|---|---|---|
| TIMID | 20150801 18:30:00 | "WHAT'S UP?" |
| ANXIOUS | 20150810 18:30:00 | "CRAM SCHOOL YET? ARE YOU OK?" |
| GLAD | 20150812 13:30:00 | "DID SOMETHING GOOD HAPPEN?" |

FIG. 17

SENT MESSAGE TABLE  ~122

| DISTRIBUTION DATE AND TIME | EMOTION OF PARTNER USER | MESSAGE CONTENTS |
|---|---|---|
| 20150701 15:10:00 | GLAD | "DID YOUR TEST GO WELL?" |
| 20150701 18:05:00 | ANXIOUS | "ARE YOU OK? HAS CRAM SCHOOL FINISHED?" |
| 20150715 18:15:00 | TIMID | "WHAT'S UP? WHY DON'T YOU COME BACK QUICKLY?" |

FIG. 18

RECEIVED MESSAGE TABLE 123

| RECEPTION DATE AND TIME | EMOTION OF PARTNER USER | MESSAGE CONTENTS |
|---|---|---|
| 20150701 15:10:30 | NORMAL | "OH! IT WENT WELL!" |
| 20150701 18:05:30 | ANXIOUS | "OK. I'VE BEEN TO RESTROOM." |
| 20150715 18:20:00 | ANXIOUS | "IT'S BEEN LONG DAY TODAY" |

FIG. 19

FREQUENTLY-USED KEYWORD TABLE 　　　　　　　　　　　124

| KEYWORD | USE FREQUENCY | DATE AND TIME FOR FINAL USE | EMOTION OF PARTNER USER |
|---|---|---|---|
| CRAM SCHOOL | 100 | 20150701 18:05:00 | ANXIOUS |
| DONE | 80 | 20150701 18:05:00 | ANXIOUS |
| DID IT GO WELL? | 10 | 20150701 15:10:00 | GLAD |

INFORMATION PROCESSING SYSTEM AND INFORMATION PROCESSING METHOD

TECHNICAL FIELD

The present disclosure relates to an information processing system and an information processing method.

BACKGROUND ART

In recent years, messages have been frequently exchanged via a network with development of a communication technology. Further, each user can bring a communication terminal such as a smartphone, a tablet terminal, a mobile phone terminal, or a wearable device, and can casually exchange messages to a friend, a family, or a lover via the network anywhere.

Further, such a technology is also proposed to automatically distribute a message to a communication terminal. For example, in the following Patent Literature 1, such a system is described that positional information of a mobile phone is obtained by using a global positioning system (GPS) function of the mobile phone, alarm is notified to one person out of an area, and the movement out of the area is also notified to another person other than the one person. Furthermore, in the following Patent Literature 2, such a system is described that, with a position detecting system set to an environment, a behavior situation of a group of humans is analyzed, if there is a lost child, a robot with mutual-operation directivity arranged in the environment talks to the child and guides the child to a place of a parent, and the current position of the child is notified to the parent searching the child.

CITATION LIST

Patent Literature

Patent Literature 1: JP 2007-295201A
Patent Literature 2: JP 2010-205015A

DISCLOSURE OF INVENTION

Technical Problem

However, in every Patent Literature described above, alarm is sent or a notification is sent in accordance with positional information of a user. It is not sufficient in viewpoint of performing an automatic response with high affinity corresponding to a situation of the user. For example, in a situation in which a message can casually be exchanged anywhere, if a user has anxiety the user can be relieved to receive a message from a reliable partner.

Consequently, according to the present disclosure, an information processing system and an information processing method are proposed to enable an automatic response to be performed with higher affinity in accordance with a mental condition of a user.

Solution to Problem

According to the present disclosure, there is proposed an information processing system including: a database that accumulates a relationship between a user for which a virtual agent is substituted and a partner user as a communication partner on a network; and a control unit that generates a message in accordance with a mental condition of the partner user and the relationship between the user and the partner user, and sends the message from the virtual agent to the partner user.

According to the present disclosure, there is proposed an information processing method including, by a processor: generating a message in accordance a mental condition of a partner use as a communication partner on a network and a relationship between a user for which a virtual agent is substituted and the partner user, is the relationship being accumulated in a database; and sending the message from the virtual agent to the partner user.

Advantageous Effects of Invention

As mentioned above, according to the present disclosure, it is possible to perform an automatic response with higher affinity in accordance with a mental condition of a user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is a diagram illustrating an example of a standard bot-response table according to the present embodiment.

FIG. 15 is a diagram illustrating an example of relational information stored in a relational information DB according to the present embodiment.

FIG. 16 is a diagram illustrating, an example of a bot-response table according to the present embodiment.

FIG. 17 is a diagram illustrating an example of a sent message table according to the present embodiment.

FIG. 18 is a diagram illustrating an example of a received message table according to the present embodiment.

FIG. 19 is a diagram illustrating an example of a keyword table that is frequently used according to the present embodiment.

MODE(S) FOR CARRYING OUT THE INVENTION

Figure 1:
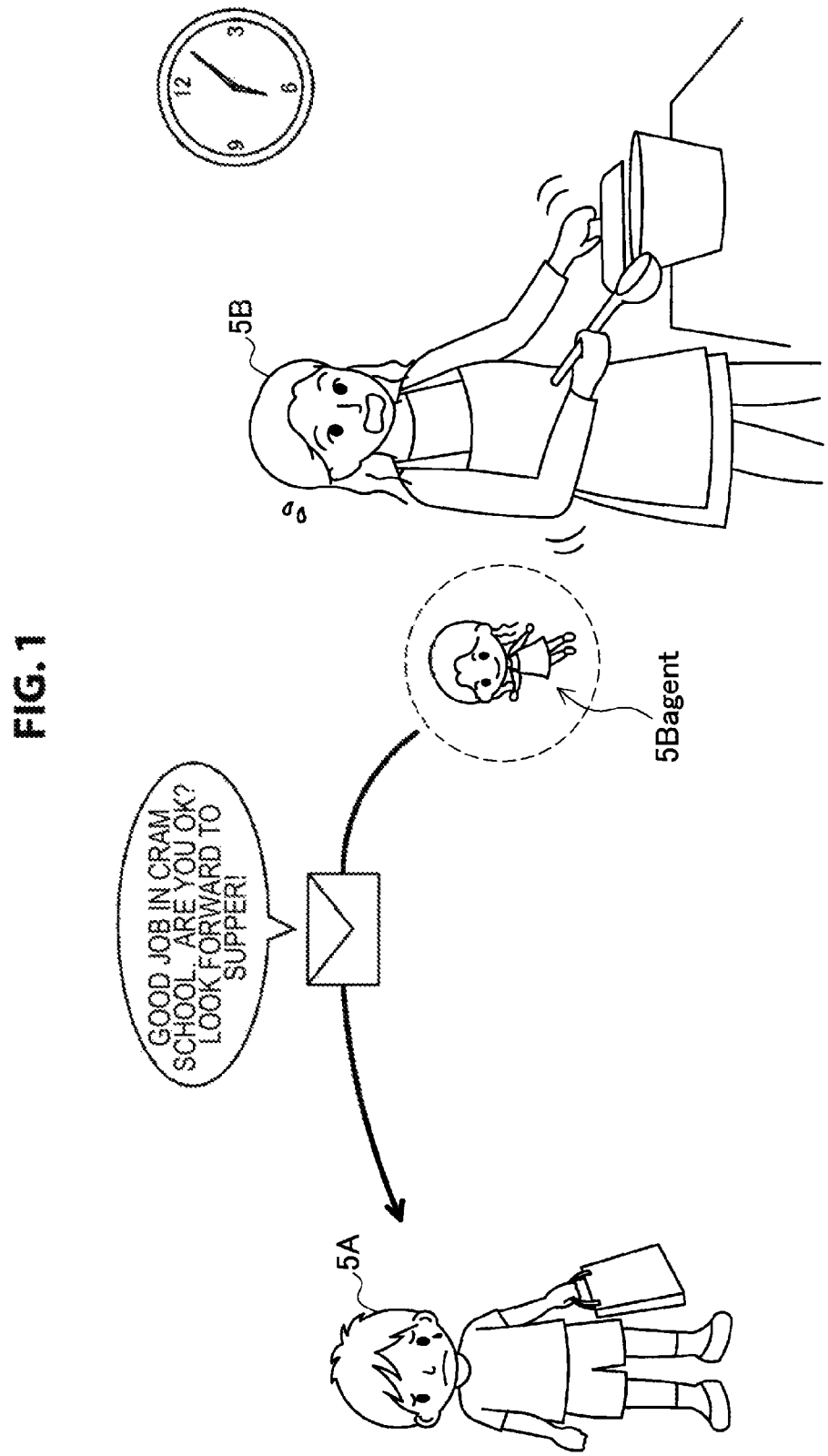
FIG. 1 is a diagram explaining an outline of an information processing system according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be given in the following order.
1. Outline of information processing system according to one embodiment of the present disclosure
2. Server configuration
3. Operating processing
3-1. First bot-response generating processing
3-2. Second bot-response generating processing
3-3. Bot-response presenting processing
4. Conclusion

1. Outline of Information Processing System According to One Embodiment of the Present Disclosure FIG. 1 is a diagram explaining an outline of an information processing system according to one embodiment of the present disclosure. As illustrated in FIG. 1, in a case of sensing a mental condition in which a user 5A (e.g., a child) has anxiety, it is possible to cause the user 5A to feel relieved under control of reaching of a message corresponding to the mental condition from a virtual agent $5B_{agent}$ as substitute for a user 5B (e.g., a mother) relating to the user 5A. In particular, in a case where the user 5B is in a busy situation and cannot promptly send a response even if a notification is sent from the user 5A or the system side, it is highly convenient also for the user B that the virtual agent $5B_{agent}$ as substitute sends a response. Further, there is an effect also on the side of the user A to feel relieved or satisfied by viewing a message corresponding to his/her own mental condition (thrilled and excited, lonely and wanting healing, timid and troubled, or the like). Further, the message from the virtual agent $5B_{agent}$ is set in consideration of a relationship between the substitute user 5B and the user 5A as a sending partner. Thus, for a partner user who receives the message, the message is impressive with higher affinity.

As mentioned above, it is possible to perform an automatic response with higher affinity in accordance with the mental condition of the user with the information processing system according to the present embodiment.

Figure 2:
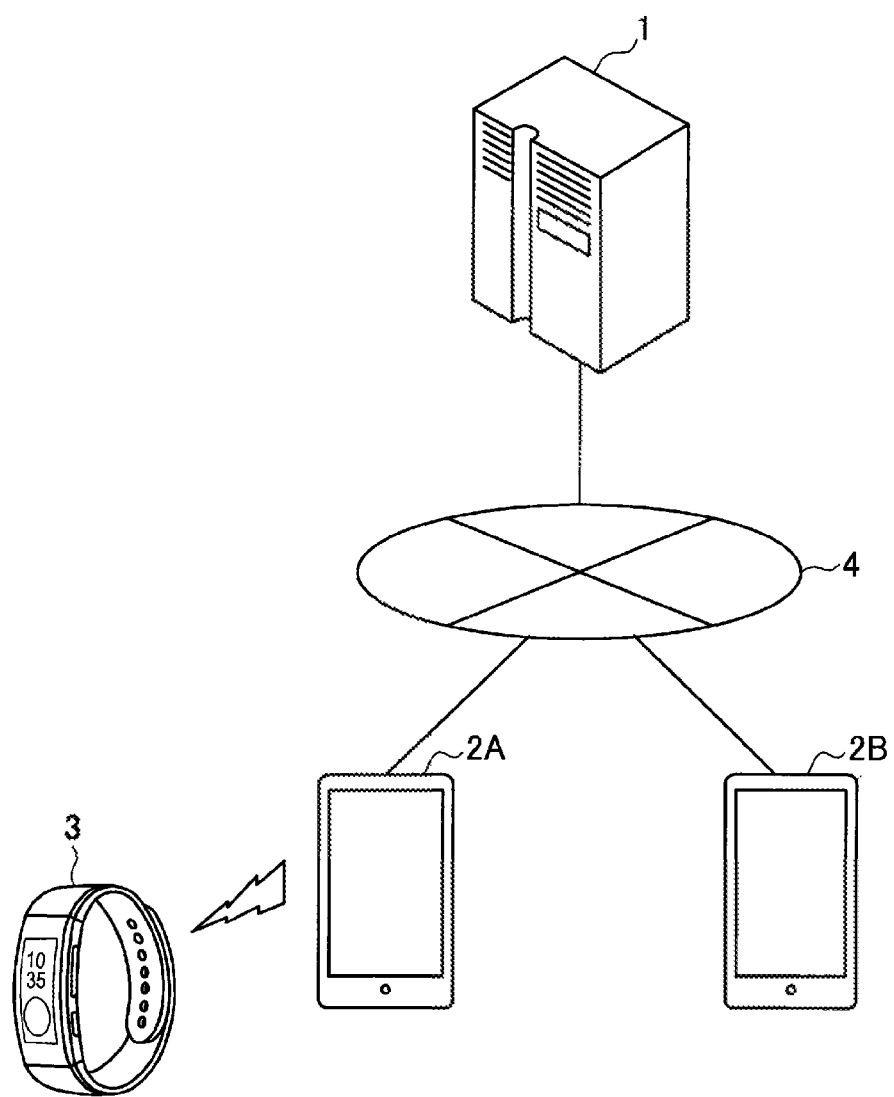
FIG. 2 is a diagram explaining the entire configuration of the information processing system according to the present embodiment.

Hereinbelow, a description will be given of a configuration of the information processing system according to the present embodiment with reference to FIG. 2. FIG. 2 is a diagram explaining the entire configuration of the information processing system according to the present embodiment.

As illustrated in FIG. 2, the information processing system according to the present embodiment includes information processing devices 2A and 2B that respective users have and a server 1. The information processing devices 2A and 2B are connected to the server 1 via a network 4 to receive and send data. Further, the information processing devices 2A and 2B can exchange messages in real time via the network 4 under control of the server 1 (e.g., text-based conversation).

The information processing device 2A can obtain, from a wearable terminal attached to a user, information such as movement, vibration, pulses, pulse waves, heart beating, an amount of sweat, breathing, blood pressure, body temperature of the user, and analyze a mental condition (e.g., emotions such as anger, disguise, scare, joy, sadness, and surprise) of the user. The wearable terminal 3 can be realized by, for example, a smart watch, a smart band, a smart eyeglass, a smart neck, a self-contained-type terminal, or the like. Note that the sensing of the user is not limited to that of the wearable terminal 3 and the sensing may be performed by the information processing device 2A or a peripheral environmental sensor. As a sensor provided for the information processing device 2A or an environmental sensor, for example, a camera, a microphone, or the like is assumed, and it is possible to capture a facial image (facial expression) of the user and record a speech of the user. In a case where the information processing device 2A senses a state of moving around at the same place on the basis of, for example, movement data of the user detected by a movement sensor, the information, processing device 2A determines a mental condition such as "undecided", "considering", "uneasy", or "timid". Further, the information processing device 2A determines a mental condition such as "glad" or "anxious/worried" by combining the facial expression extracted from the captured image obtained by capturing the image of the face of the user and pulses sensed from a pulse sensor. Further, the information processing device 2A can determine a mental condition such as "tired" by combining sighs, eye movement and the facial expression of the user. The information processing device 2A can determine the mental conditions by using, for example, mechanical learning.

The server controls to generate a message to a partner user and send the message from a virtual agent of a substitute user to the partner user in accordance with the mental condition of the partner user obtained front the information processing device 2A and a relationship between the partner user and the substitute user (the user of the information processing device 2B). As a consequence, it is possible to automatically send the message with high affinity corresponding to the mental condition of the partner user and the relationship with the user.

The above description has been given of the outline of the information processing system according to the present embodiment. Subsequently, a specific description will be given of a configuration and operating processing, of the information processing system according to the present embodiment. Note that a virtual agent that performs an automatic response is referred to as a hot according to the present embodiment, which will be described below.

2. Server Configuration

Figure 3:
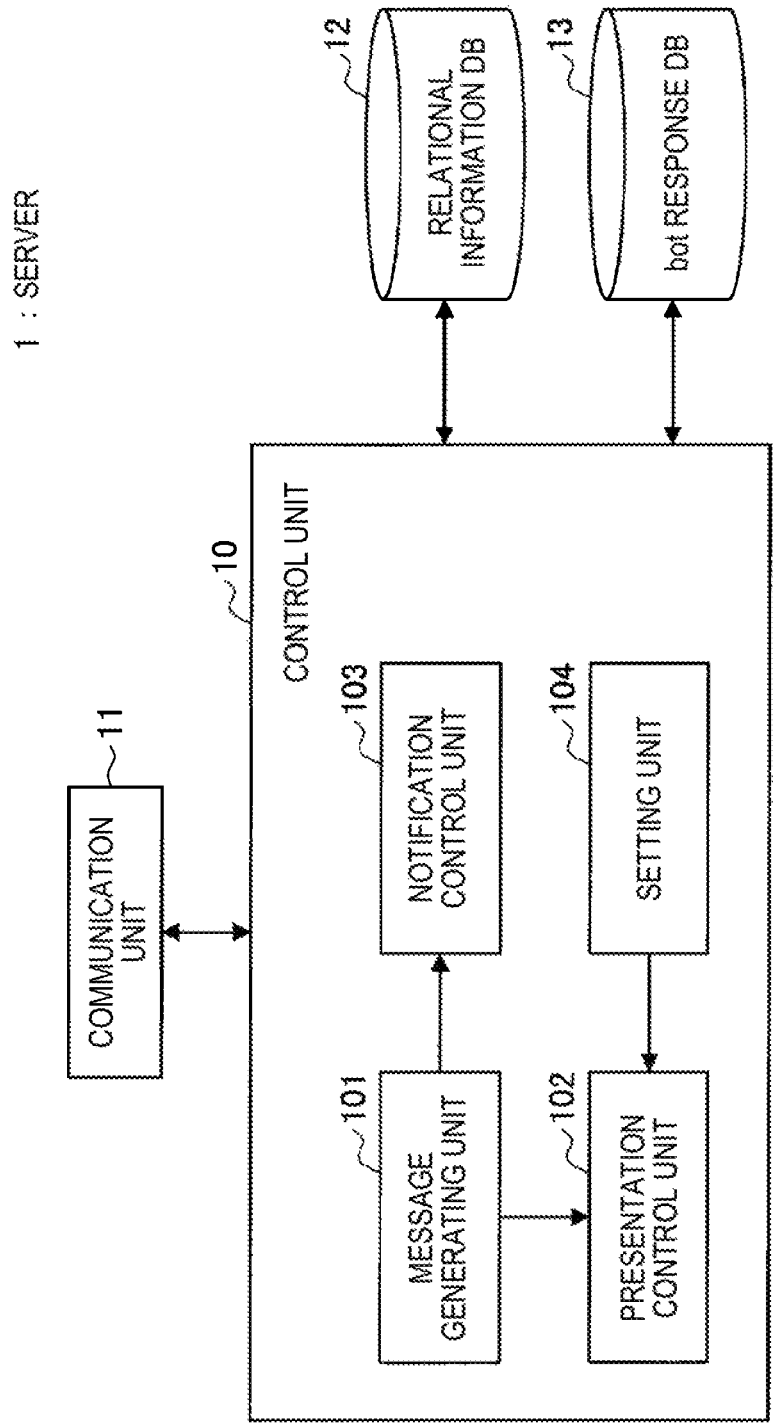
FIG. 3 is a block diagram illustrating an example of a configuration of a server according to the present embodiment.

FIG. 3 is a block diagram illustrating an example of a configuration of the server 1 according to the present embodiment. As illustrated in FIG. 3, the server 1 includes a control unit 10, a communication unit 11, a relational information database (DB) 12, and a bot response DB 13.

The communication unit 11 sends and receives data to/from an external device via a wired/wireless manner. For example, the communication unit 11 is connected to the information processing devices 2A and 2B to receive and send data.

The control unit 10 functions as an arithmetic processing device and a control device, and controls the whole operations in the server 1 under various types of programs. For example, the control unit 10 is realized by a central processing unit (CPU) or an electronic circuit such as a microprocessor. Further, the control unit 10 according to the present embodiment also functions as a message generating unit 101, a presentation control unit 102, a notification control unit 103, and a setting unit 104.

The message generating unit 101 generates a message to a partner user in accordance with the mental condition of the partner user obtained from the information processing device 2A and the relationship between the partner user and a substitute user. Further, the message generating unit 101 can also analyze contents of a message that was exchanged from/to the partner user by the user in the past, and generate the message by using a frequently used expression or a way of speaking. Further, the message generating unit 101 can also create a response mixed to a key word used in the past exchange. Furthermore, the message generating unit 101 mines context in the past exchange and generates a message by referring to a response of the user in a case where a partner had the same mental condition in the past, thereby enabling a uniform feeling of the response to be made or a response with a slight change to be generated.

Further, the message generating unit 101 may analyze contents of the message that was exchanged between one user and another user in the past and use the contents thereof for generating a message to the partner user. In particular, even in a case where the user did not exchange a message with the partner user in the past, the contents thereof are generated on the basis of the past message between the user and the other user, thereby making the contents thereof similar to a way of speaking or an expression of the user. Further, also in consideration of the past message the other user, it is possible to vary the hot response to the partner user.

The presentation control unit 102 controls to send the message generated by the message generating unit 101 to the partner user, set as being sent from the virtual agent of a substitute user. Specifically, the presentation control unit 102 controls to post a message on chat screens of a user and a substitute user thereof with an icon of the substitute user (or an icon of the user processed for a bot), and controls to send a message as an email from the virtual agent to the information processing device of the partner user.

The notification control unit 103 controls to send a notification to the substitute user before/after presenting the message generated by the message generating unit 101 to the partner user. As a consequence thereof, the user who receives the notification can check which message the hot as the substitute user thereof sends or thinks to send to the partner, and can edit it as necessity.

The setting unit 104 has a function for setting whether the bot response is possible. Specifically, the setting unit 104 sets whether or not the bot response is performed for every partner user, every mental condition, and every time slot. The setting can arbitrarily be designated by, for example, the user. Herein, the bot response setting will be specifically described with reference to FIGS. 4 and 5.

Figure 4:
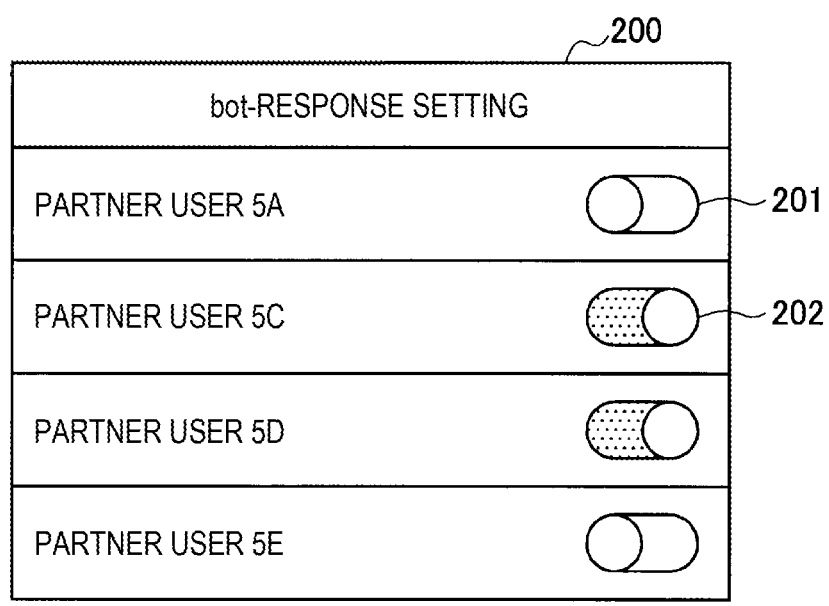
FIG. 4 is a diagram illustrating an example of a bot-response setting screen that can be set for every partner user according to the present embodiment.

FIG. 4 is a diagram illustrating an example of a bot-response setting screen 200 that can be set for every partner user. The user can set whether or not a response with a bot (i.e., the virtual agent) substituted for the user for every partner user is performed by using the bot-response setting screen 200 illustrated in the drawing. Buttons 201 and 202 or the like can set ON/OFF of the bot response. In an example illustrated in FIG. 4, the button 201 sets the bot response of the partner user 5A to OFF and the button 202 sets the bot response of a partner user 5C to ON. If setting the bot response to ON, the bet response can more specifically be set. Hereinbelow, a description will be given with reference to FIG. 5.

Figure 5:
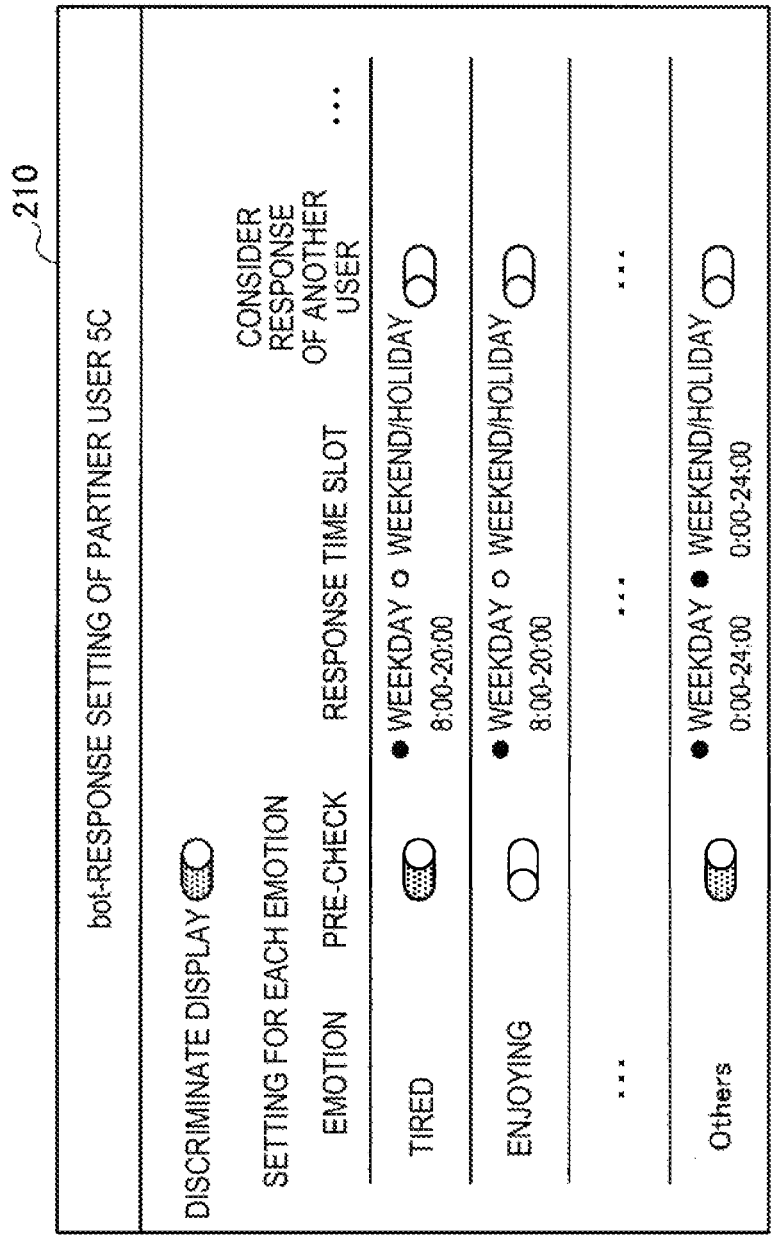
FIG. 5 is a diagram illustrating an example of details of a bot-response seating screen for every partner user according to the present embodiment.

FIG. 5 is a diagram illustrating an example of details of a bot-response setting screen 210 for every partner user. In an example illustrated in the drawing, the hot response can be more specifically set in a case of setting the bat response of a partner user a to ON. On the bet-response setting screen 210, the discrimination of display can be set and the hot response for every emotion can be set.

The setting of the discrimination of display means setting about whether or not display is discriminated between the response with the bot and the response of the user. In the example illustrated in FIG. 5, "discrimination of display" of the bot-response setting screen 210 is set to ON. In a case where the discrimination of display is set to ON and the partner user a presents the message (i.e., bot response) generated by the message generating unit 101, the presentation control unit 102 controls to present the message in a display form different from that in a case of presenting the message from the user (i.e., at general time). Note that the setting of the discrimination of display is not limited to the example illustrated in FIG. 5, and further may be able to be set for each emotion. That is, for example, in the bot response to the partner user 5C in a case of "tired", the display is not discriminated. In the bot response to the partner user 5C in a case of "enjoying", it may be able to set to discriminate the display. Herein, a description will be given of an example of the discrimination of display with reference to FIGS. 6 and 7.

Figure 6:
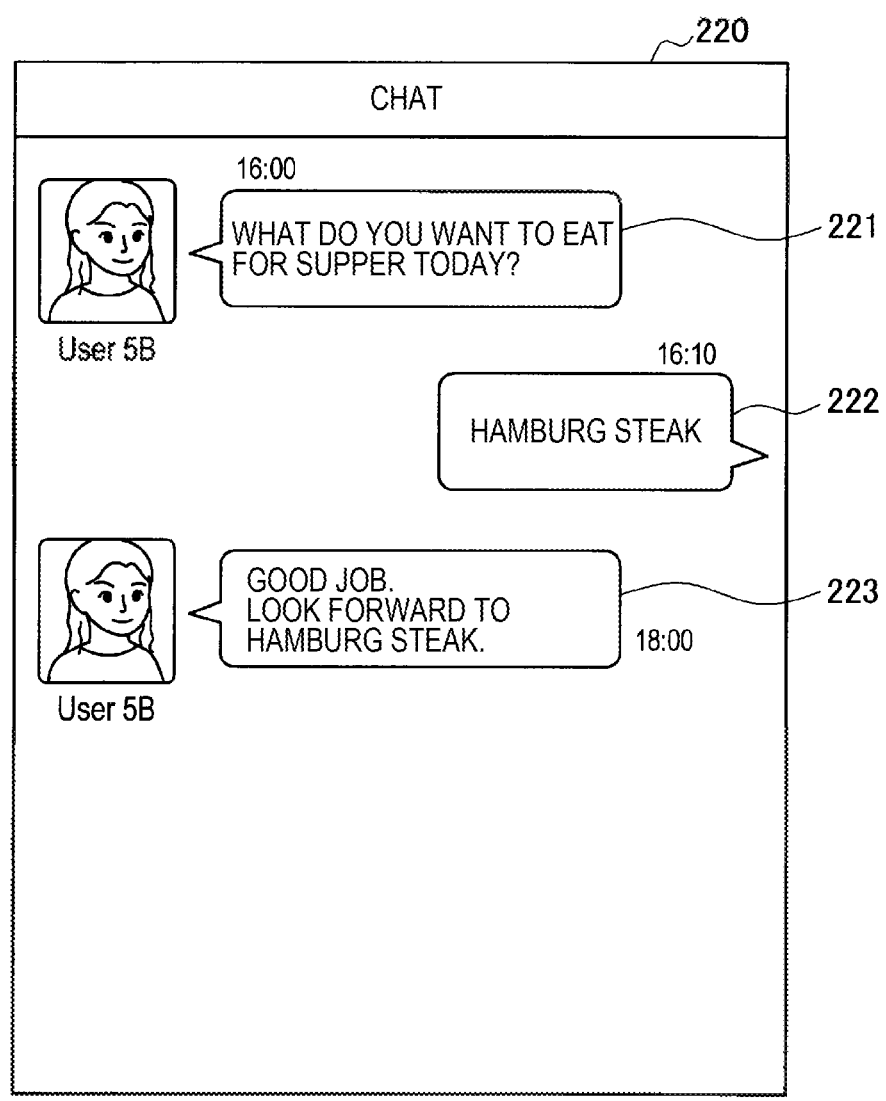
FIG. 6 is a diagram illustrating an example of a chat screen of a partner user in a case where display with a bot response is not discriminated according to the present embodiment.

FIG. 6 is a diagram illustrating an example of a chat screen of the partner user in a case where the display with the bot response is not discriminated according to the present embodiment. In an example illustrated in the drawing, a message 221 is input by the user 5B, and a message 223 is input by the bot of the user 5B, i.e., a response that is generated by the message generating unit 101 in the server 1 and controlled for presentation by the presentation control unit 102. However, the display is not discriminated at all. In a case where a message 222 input by the user 5C is displayed at 16:10 and thereafter a constant time passes, as a trigger to sense that the mental condition of the user 5C is "tired" or "hungry", the message 223 of the bot response is generated by the message generating unit 101 in the server 1 and is controlled for presentation by the presentation control unit 102.

Figure 7:
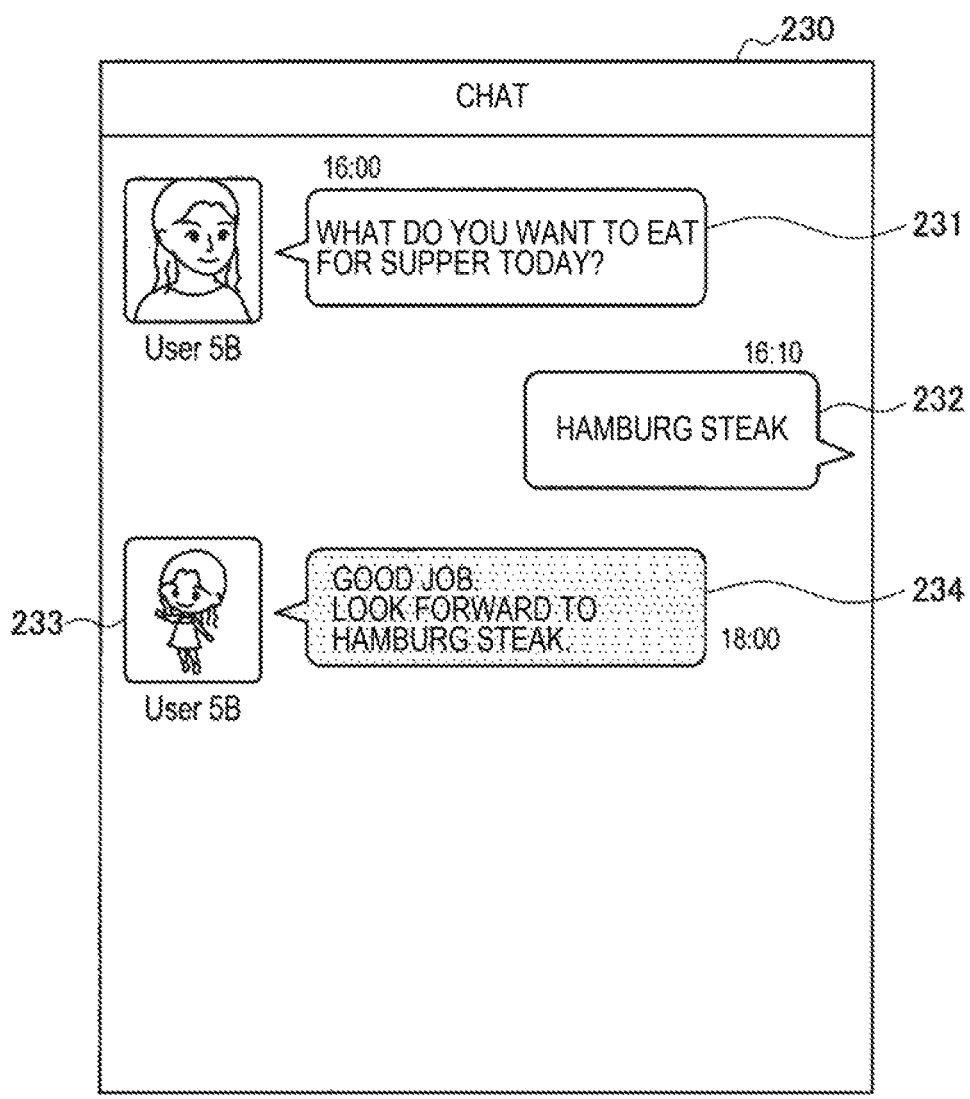
FIG. 7 is a diagram illustrating an example of the chat screen of the partner user in a case where the display of the bot response is discriminated according to the present embodiment.

FIG. 7 is a diagram illustrating an example of the chat screen of the partner user in a case where the display of the bot response is discriminated according to the present embodiment. In the example illustrated in the drawing, a chat screen 230 displays a message 234 input by the bot that is substituted for the user 5B in a display form different from a message 231 input by the user 5B. Specifically, color of a display area of the message 234 is different. Note that the discrimination of the display form of the message is not limited to this and the presentation control unit 102 may control, for example, a font or a display frame of the message to be different. Further, as illustrated in FIG. 7, in a case of displaying the message 234 input by the bot, the presentation control unit 102 may process an icon of the user 5B, and display the bot response with an icon 233 that causes understanding of a speech with the bot substituted for the user 5B. In the example illustrated in FIG. 7, as a processing example, the user 5B is used as a bot (character). However, the present embodiment is not limited to this and, for example, an image added with processing like changing color or tone of the icon of the user 5B may be used.

In the setting for each emotion, for example, as illustrated in FIG. 5, it is possible to set "pre-check", "response time slot", "consider response of another user" and the like for every emotion (i.e., the mental condition) of the partner user. The "pre-check" is setting about whether or not the user checks contents of the bat response to the partner user before presenting the contents to the partner user, in the example illustrated in FIG. 5, the bot response at emotion time of "tired" and another emotion time of the partner user 5C is set to ON in the pre-check. Therefore, the server 1 notifies, by the notification control unit 103, the substitute user 5B of contents of the message or the like, before sending the message generated by the message generating unit 101 to the partner user 5C. A specific description will be given of a case of performing the pre-check to the user 5B with reference to FIG. 8.

Figure 8:
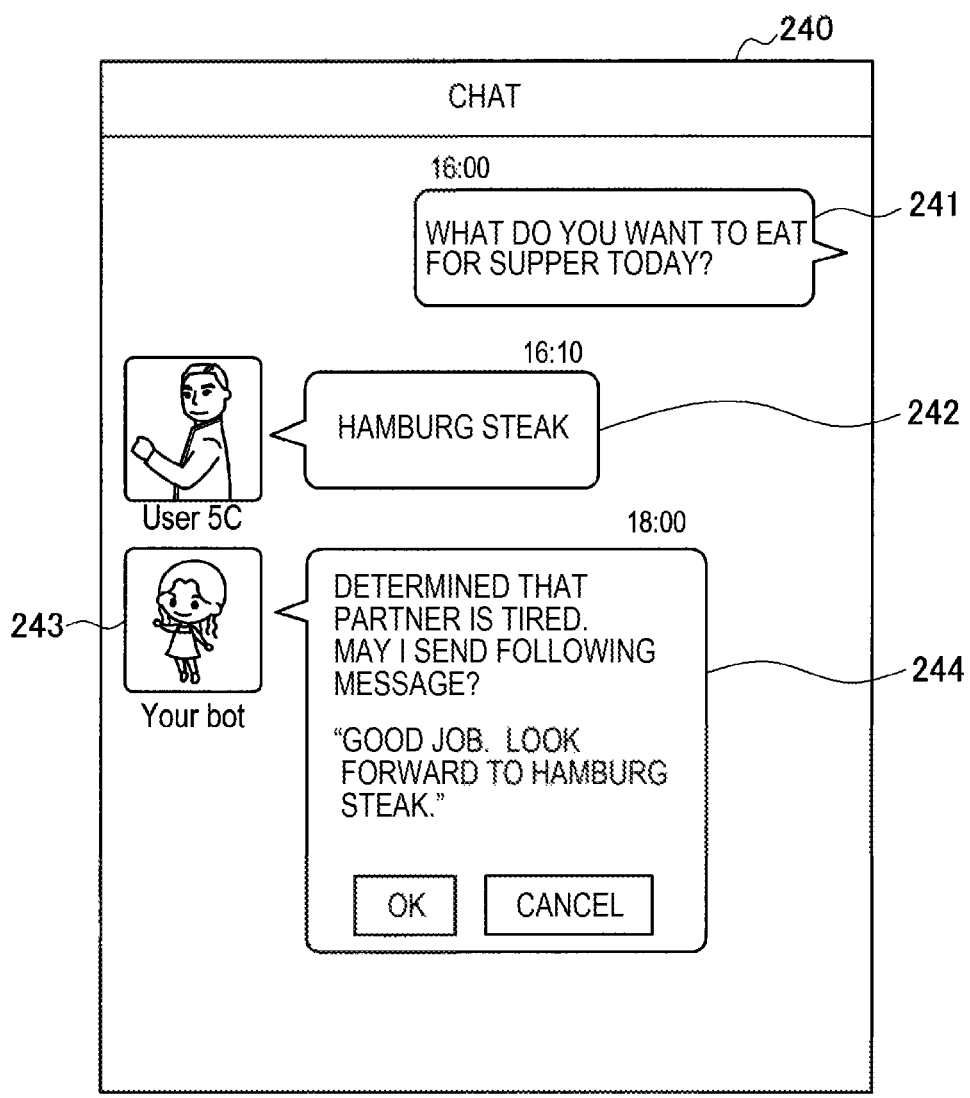
FIG. 8 is a diagram explaining pre-check to a user with a bot response according to the present embodiment.

FIG. 8 is a diagram explaining the pre-check to the user with the bot response according to the present embodiment. A chat screen 240 illustrated in FIG. 8 is displayed on the information processing device 2 (for example, the information processing device 2B illustrated in FIG. 1) of the user 5B. A message 241 displayed on the chat screen 240 in FIG. 8 is input by the user 5B, and a message 242 is input by the partner user 5C. Subsequently, in a case where the message 242 input by the partner user 5C is displayed at 16:10 and thereafter a constant time passes, as a trigger to sense that the mental condition of the partner user 5C is "tired" or "hungry", the message generating unit 101 in the server 1 generates the message. Herein, in a case of setting the "pre-check" to ON, the server 1 notifies in advance, by the notification control unit 103, the user 5B of the message generated by the message generating unit 101. A message 244 illustrated in FIG. 8 is a notification message of the pre-check. An icon 243 is used as a bot icon of the user 5B. The user 5B checks contents of the bot response included in the message 244. If it is OK, an OK button is tapped. In a case of cancelling, the sending, a cancel button is tapped. Herein, in a case of tapping the OK button, the server 1 pops up and displays a menu screen 251 on a screen 250 as illustrated in FIG. 9, thereby enabling the user 5B to select editing of the contents of the bot response or the like.

Figure 9:
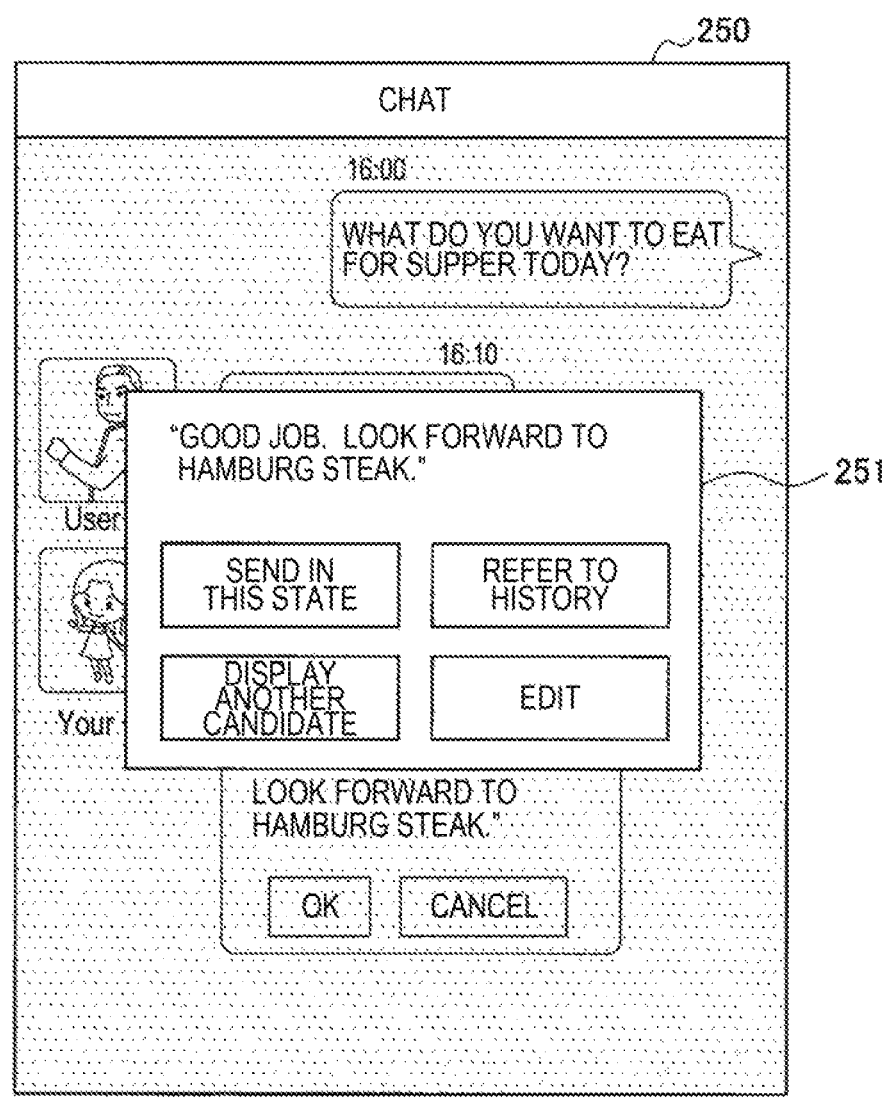
FIG. 9 is a diagram explaining an example of a menu screen displayed in a case of permitting a bot response according to the present embodiment.
Figure 10:
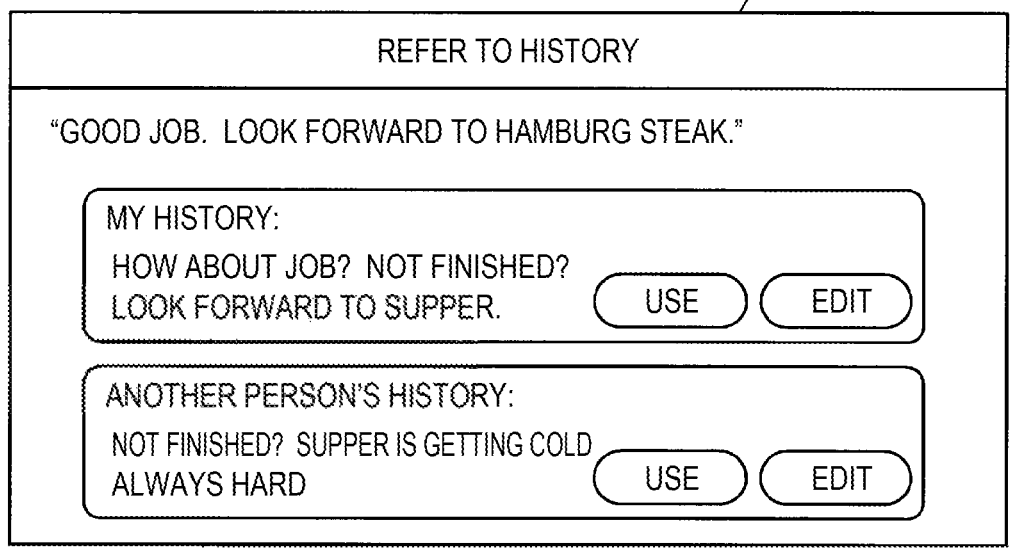
FIG. 10 is a diagram illustrating an example of a history referring screen according to the present embodiment.

FIG. 9 is a diagram explaining an example of a menu screen displayed in a case of permitting the bot response. As illustrated in FIG. 9, the menu screen 251 includes a "send in this state" button, a "history reference" button, a "display another candidate" button, and an "edit" button. In a case where the "send in this state" button is tapped, the server 1 controls to present the notified bot response to the partner user. In a case where the "history reference" button is tapped, the server 1 controls to display a history reference screen 252 illustrated in FIG. 10. As illustrated in FIG. 10, on the history referring screen 252, "my history" and "another person's history" are displayed as bot response candidates. In the "my history", under the same situation in the past (for example, the partner user, the mental condition of the partner user, time slot, contents, and the like), the history of the message that my (herein, the user 5B) bot responded is displayed. Further, in the "another person's history", under the same situation in the past (for example, the mental condition of the partner user, time slot, contents, and the like), the history of the message that the bot of another person (herein, a user other than the user 5B) responded is displayed. The user 5B can edit the bot response by referring to the bot response history of the user 5B or another person. Note that, in a case where there is no history, on the menu screen 251 illustrated in FIG. 9, the "history reference" button is not displayed.

Further, in the menu screen 251 in FIG. 9, in a case of tapping the "display another candidate" button, the server 1 generates another candidate of the bot response by the message generating unit 101 and displays the candidate.

Figure 11:
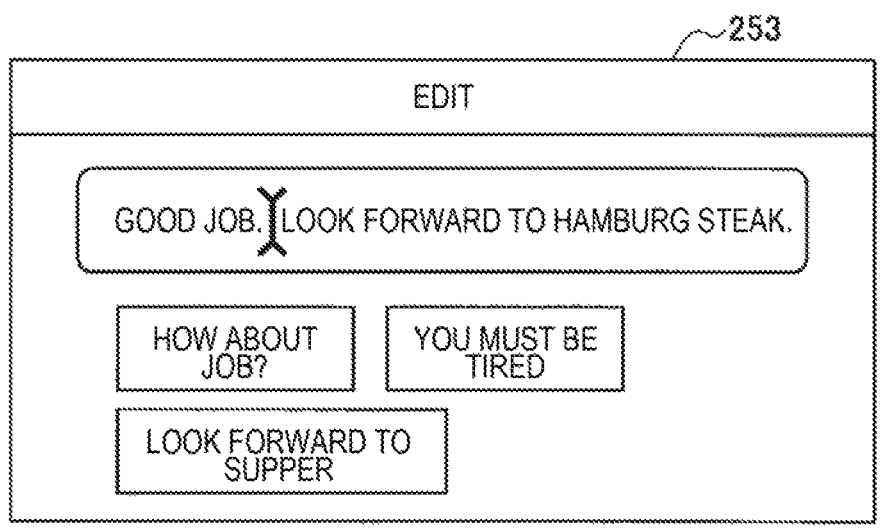
FIG. 11 is a diagram illustrating an example of an editing screen according to the present embodiment.

In a case of tapping the "edit" button, the server 1 displays an editing screen 253 as illustrated in FIG. 11. As illustrated in FIG. 11, on the editing screen 253, text of the bot response can be edited. Further, on the editing screen 253, the message generating unit 101 can also present a keyword as a candidate extracted by analyzing syntax of the exchanged past messages. As a consequence, the user cart easily edit the contents of the bot response.

Next, returning to FIG. 5, a description will be given of setting a "response time slot" for every emotion illustrated in the bot-response setting screen 210. The setting of the "response time slot" means to set whether or not the bot response is performed for every emotion, depending on a time slot. For example, in an example illustrated in FIG. 5, in a case where the partner user 5C is at emotion time of "tired" and at emotion time of "enjoying", it is set to perform the bot response if the time is from eight o'clock to twenty o'clock in weekday. Further, in a case of the time of another emotion ("Others" illustrated in FIG. 5) that is not listed as a specific emotion, it is set to perform a bot response at any time in weekday, weekend, and holidays. Note that, for example, a setting method that sets to enable a bot response until after eight hours because of work from now on is also possible as well as designation of the time slot.

Subsequently, a description will be given of setting "consider response of another user" for every emotion illustrated in the bot-response setting screen 210. The message generating unit 101 according to the present embodiment analyzes syntax of past messages exchanged between the partner user and the user, and picks up a keyword. Basically, a message is generated by using the keywords and usual expression and way of speaking. However, in a case where "consider response of another user" is set to ON, a message is generated by further using bot response information relating to another user.

In the example illustrated in FIG. 5, "consider response of another user" is all set to OFF. However, in a case of setting "consider response of another user" to ON, the message generating unit 101 generates a message by using, for example, a syntax analyzing result of the past message of another user to the partner user whose same emotion is sensed.

The bot response setting has been specifically described above. However, setting matters according to the present embodiment are not limited to the examples illustrated in FIG. 5, and can set, for example, whether or not a way of speaking of the message generated as the bot response is made similar to a way of speaking of the user, and whether or not a way of speaking of the message is made totally different from the way of speaking, of the user.

Further, "others" emotions illustrated in FIG. 5 are other emotions that are not exemplified as a specific example. Further, also in a ease of any emotion, in a case where the emotion as the mental condition of the partner user exceeds a threshold, the emotion may be observed. As a consequence, at "normal time" when a specific emotion does not stand out, it is possible to set the emotion not to be included in any emotions illustrated in FIG. 5 including "others" and not to be a target of the bot response.

The above-described information relating to the setting of the bot response is stored in the relational information DB 12 with link to the user ID.

Subsequently, returning to FIG. 3, the relational information DB 12 in the server 1 is a database that accumulates a relationship between a user for which the bot (virtual agent) is substituted and a partner, user that communicates with the user on the network. Not only a relationship between the respective users but also, for example, the past history (for example, the bot response history, the received and sent messages, "frequently used keyword" based on the analysis of the message, or the like) relating to the communication between the users is stored in the relational information DB 12. The relationship between the users may be registered in advance by the user, or may be automatically registered by the control unit 10 in the server 1 with analysis of the exchange of past messages therebetween. As the relationship between the users, for example, a spouse, a lover, a parent relationship (parent/child), a brother, a working place (boss/subordinate), a friend (close friend/light relationship), or a senior/junior, and the like are assumed. Note that in the setting of the bot response described with reference to FIG. 4, it can be set whether or not the bot response is possible for every specific partner. However, the present embodiment is not limited to this, and it is also possible to, set whether or not the bot response is possible for every "relationship" registered in the relational information DB 12. Further, the "relationship" therebetween is also used in a case where the message generating unit 101 generates the message, and it is also possible to vary a way of speaking or an expression of the message in accordance with a relationship with the partner.

3. Operating Processing

Subsequently, a description will be given of operating processing of the information processing system according to the present embodiment.

<3-1. First Bot-Response Generating Processing>

Figure 12:
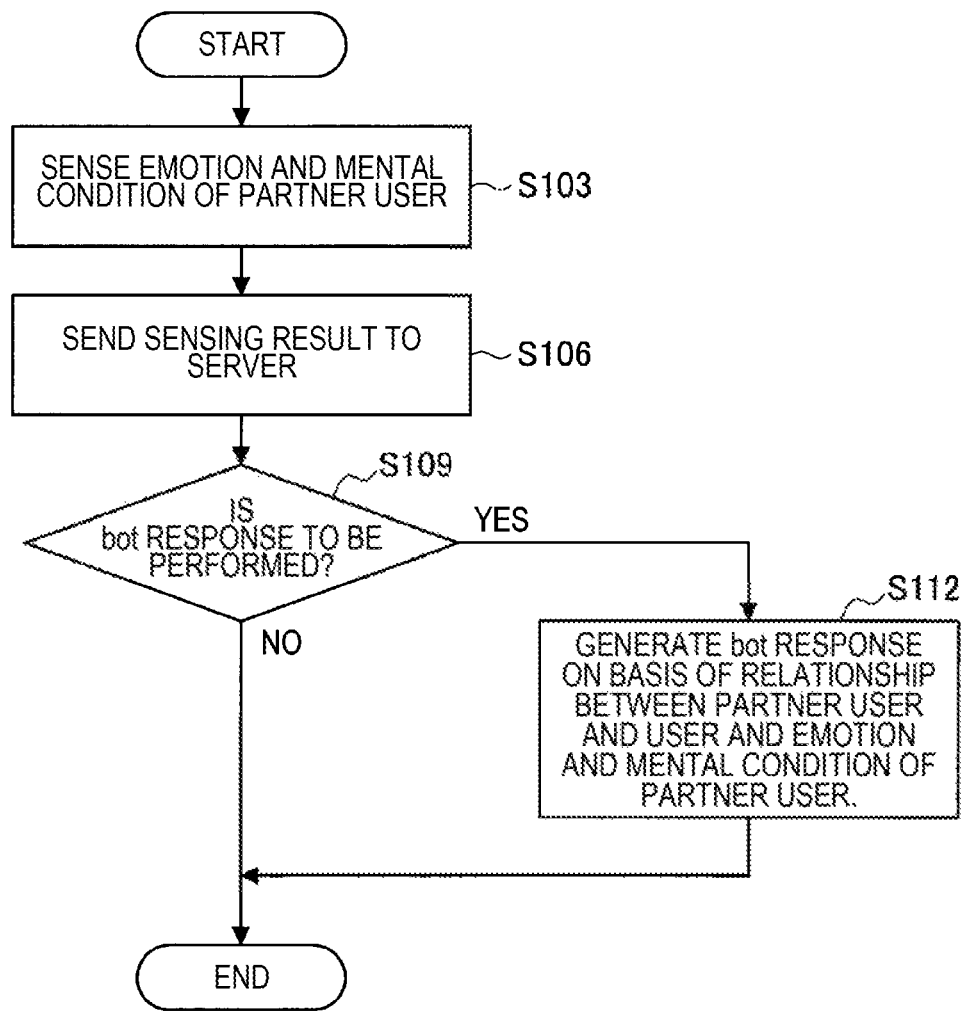
FIG. 12 is a flowchart illustrating first bot-response generating processing according to the present embodiment.

FIG. 12 is a flowchart illustrating first bot-response generating processing according to the present embodiment. As illustrated in FIG. 12, first, the emotion and mental condition of the partner user are sensed by the information processing device 2A of the partner user (step S103).

Next, the information processing device 2A sends a sensing result to the server 1 (step S106).

Subsequently the control unit 10 in the server 1 determines whether or not the bot response is to be performed to the partner user (step S109). Specifically for example, the control unit 10 determines whether or not the bot response is to be performed on the basis of the sensed mental condition or time slot by referring to bot response setting information registered with the link to the user ID to which the relationship with the partner user is registered with reference to the relational information DB 12.

Subsequently in a case where it is determined that the bot response is to be performed (step S109/Yes), the message generating unit 101 refers to the relational information DB 12, and generates the bot response on the basis of the relationship between the partner user and the user and the emotion and mental condition of the partner user (step S112). The message generating unit 101 generates a message by using, for example, a standard bot-response table stored in the bot response DB 13. Herein, FIG. 13 illustrates an example of the standard bot-response table. As illustrated in FIG. 13, a standard bot-response table 130 stores a standard bot-response corresponding to the emotion of the partner user and the relationship with the partner user. The message generating unit 101 can generate the bot response corresponding to the emotion of the partner user and the relationship between the partner user and the user in accordance with the standard bot-response table 130.

<3-2. Second Bot-Response Generating Processing>

Figure 14:
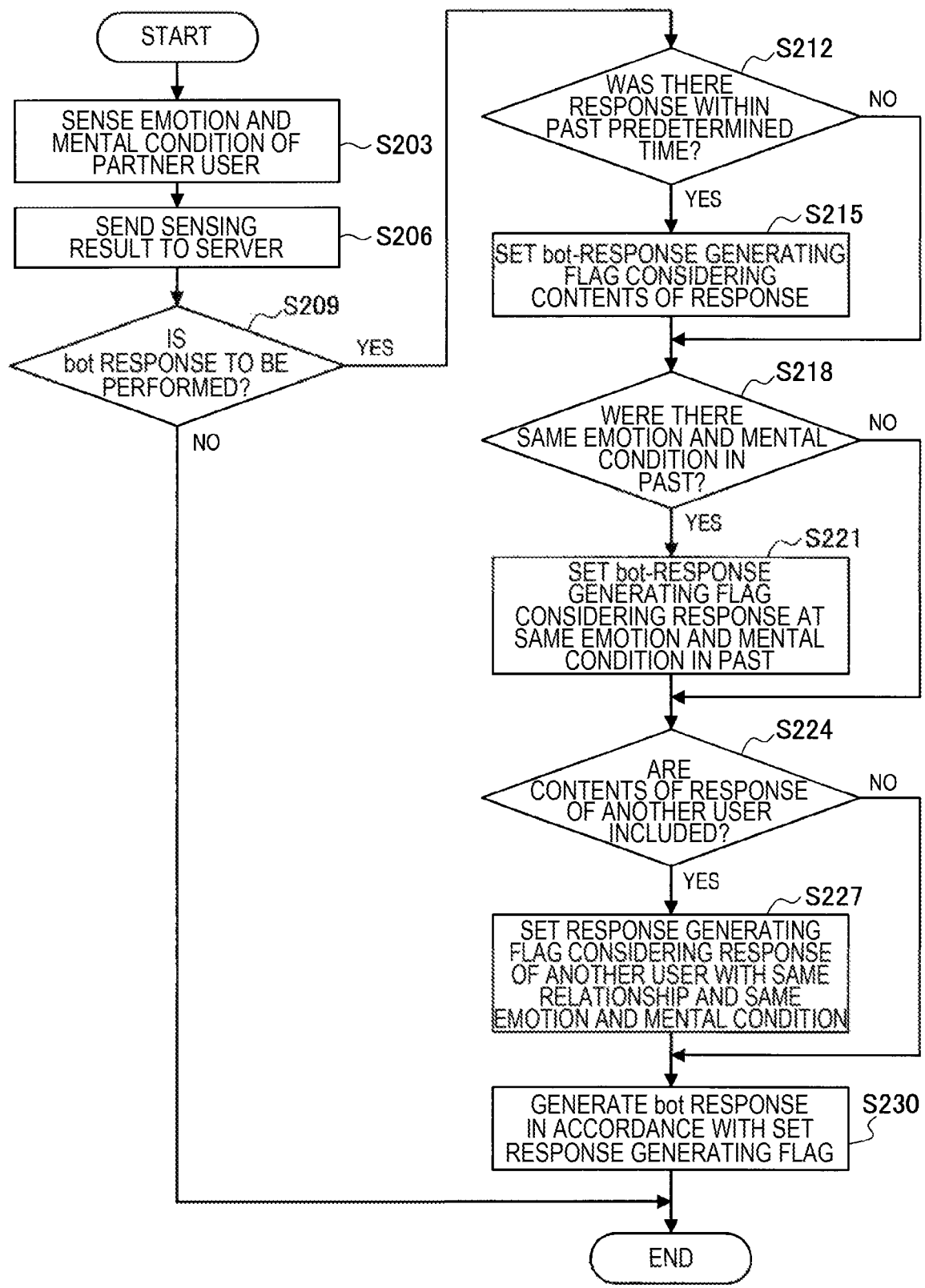
FIG. 14 is a flowchart illustrating second bot-response generating processing according to the present embodiment.

FIG. 14 is a flowchart illustrating second bot-response, generating processing according to the present embodiment. In the second bot-response generating processing, the bot response is generated by further using various information such as the past history.

First, in steps S203 to S209 illustrated in FIG. 14, processing similar to that in steps S103 to S109 illustrated in FIG. 12 is performed. Therefore, a description is omitted here.

Next, in a case where it is determined that the bot response is to be performed (step S212/Yes), the message generating unit 101 in the server 1 determines whether or not there was a response (specifically, exchange of the message) between the partner user and the user within a recent past predetermined time (step S212).

Subsequently, in a case where there was the response within the past predetermined time (step S212/Yes), the message generating unit 101 sets a bot-response generating flag considering contents of the response (step S215). On the other band, in a case where there is no response (step S212/No), the flag is not set.

Next, the message generating unit 101 determines whether or not there is a communication history (specifically, exchange of the message) at the time of the same emotion and mental condition of the partner user as the current one in the past history between the partner user and the user (step S218).

Subsequently, in a case where there was the past history at the time of the same emotion and mental condition (step S218/Yes), the message generating unit 101 sets the bot-response generating flag also considering the response at the time of the same emotion and mental condition in the past (step S221). On the other hand, in a case where there is no past history (step S218 No), the flag is not set.

Next, the message generating unit 101 determines whether or not response contents of another user are also included (step S224). Specifically; the message generating unit 101 determines on the basis of ON/OFF of "consider response of another user" in the setting information stored with link to the user ID.

Subsequently, in a case where the response contents of another user are also included (step S224/Yes), the message generating unit 101 sets a bot-response generating flag considering a response of another user with the same relationship, the same emotion and mental condition as the current one (step S227). On the other hand, in the case where the response contents of another user are not included (step S224/No), the flag is not set.

Subsequently, the message generating unit 101 generates the bot response on the basis of the set response generating flag (step S230). That is, the bot response is generated by using at least any of the past history of the responses within a past predetermined time and the same emotion and mental condition and the past history of another user with the same relationship and the same emotion and mental condition. In the case, the message generating unit 101 can automatically generate the bot response with analysis of syntax on the basis of various types of information accumulated in the relational information DB 12. Herein, a description will be given of the various types of information stored in the relational information DB 12 with reference to FIGS. 15 to 19.

FIG. 15 is a diagram illustrating an example of relational information stored in the relational information DB 12 according to the present embodiment. As 130 illustrated in FIG. 15, the relational information 120 includes a user ID, a partner user ID, a relationship therebetween, a bot response history therebetween, a sent message history from the user to the partner user, a received message history from the partner user, and "frequently used keyword" information extracted with the analysis of syntax on the basis of the histories. Note that the data structure illustrated in FIG. 15 is an example and the present embodiment is not limited to this. Hereinbelow, a description will be given of examples of each table illustrating the bot response history, the sent message history, and the received message his or therebetween illustrated in FIG. 15.

FIG. 16 is, a diagram illustrating an example of the bot-response table. As illustrated in FIG. 16, the contents and date and time of the past bot response to the partner user are sent and the emotion (or the mental condition) of the partner user in the case are stored in a bot-response table 12I.

FIG. 17 is a diagram illustrating an example of a sent message table. As illustrated in FIG. 17, a sent message table 122 stores contents and date and time of the past message of the response of the user to the partner user and the emotion (or the mental condition) of the partner user in the case.

FIG. 18 is a diagram illustrating an example of a received message table. As illustrated in FIG. 18, a received message table 123 stores contents and date, and time of the past message received by the user from the partner user and the emotion (or the mental condition) of the partner user in the case.

The message generating unit 101 can generate a new automatic response message by analyzing the syntax of the contents with reference to the sent message table 122 and the received message table 123 in consideration of a relationship of the two persons.

FIG. 19 is a diagram illustrating an example of a keyword table that is frequently used. As illustrated its FIG. 19, a frequently-used keyword table 124 stores a keyword extracted from the analyzed syntax of the received and sent messages. The example illustrated in FIG. 19 is on a unit basis of word. However, a message that is frequently used (high use frequency) between the user and the partner user may be extracted for every scene and be stored. Note that syntax analyzing information used in a case of extracting a word, natural language processing information, and the like may be stored in a storing unit (not illustrated) in the server 1.

<3-3. Bot-Response Presenting Processing>

Figure 20:
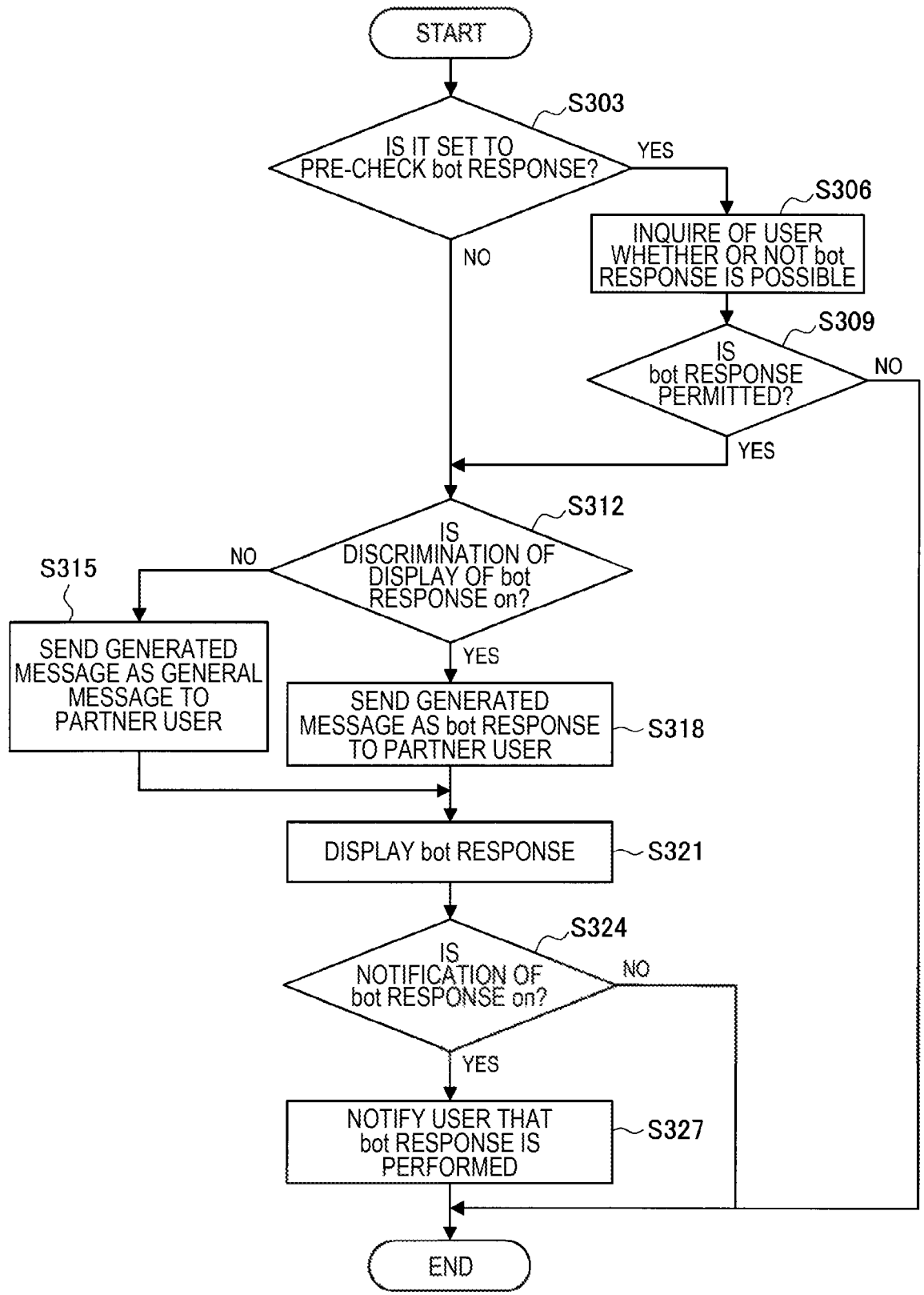
FIG. 20 is a flowchart illustrating bot-response presenting processing according to the present embodiment.

Subsequently, a description will be given of processing in a case of presenting the message in the bot response generated by the first bot-response generating processing or the second bot-response generating processing to the partner user with reference to FIG. 20. FIG. 20 is a flowchart illustrating the bot-response presenting processing according to the present embodiment.

As illustrated in FIG. 20, first, the presentation control unit 102 in the server 1 checks whether or not it is set to pre-check (refer to FIG. 5) the bot response (step S303).

Next, in a case where it is set to pre-check the bot response (step S303/Yes), the presentation control unit 102 inquires of the user whether or not the bot response is possible (step S306). It is inquired of the user as mentioned above with reference to FIG. 8.

Subsequently, in a case where the bot response is permitted (step S309/Yes), the presentation control unit 102 checks whether or not the discrimination of display of the bot response (refer to FIG. 5) is on (step S312).

Next, in a case where the discrimination of display of the bot response is not on (step S312/No), the presentation control unit 102 sends the generated message as a general message to the partner user (step S315).

On the other band, in a case where the discrimination of display of the bot response is on (step S312/Yes), the presentation control unit 102 sends the generated message as a bot response to the partner user (step S318).

Subsequently, the information processing device 2A that received the message from the server 1 displays the bot response (step S321). In the case, the information processing device 2A displays the bot response without discrimination from the general message (the message input by the user) in a case where the message is sent as the general message, as described with reference to FIG. 6, and displays the bot response with discrimination from the general message (in a different display form) in a case where the message is sent as the bot response, as described with reference to FIG. 7.

Next, the notification control unit 103 in the server 1 checks whether or not the notification of the bot response is on (step S324). In a case of on (step S324/Yes), it is controlled to send a notification that the bot response is performed to the user (step S327).

4. Conclusion

As mentioned above, the information processing system according to the embodiment of the present disclosure, it is possible to perform an automatic response with higher affinity in accordance with the mental condition of the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to produce a computer program to cause hardware such as a CPU, a ROM, and a RAM included in the above-mentioned server 1 to exhibit the functions of the server 1. Further, a computer-readable storage medium that stores the computer program is also provided.

Further, the information processing system according to the present embodiment is not limited to the text chat but can be applied to voice chat. For example, such a voice chat system is assumed that text is converted into sound and the sound is reproduced. Furthermore, in a case of applying the information processing system to the voice chat system, in a case where the message generating unit 101 generates a message of a bot response in the server 1, synthesized sound is generated by using phoneme data of a person linked to the bot, and it can be controlled to output a bot message with the sound similar to the person.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a database that accumulates a relationship between a user for which a virtual agent is substituted and a partner user as a communication partner on a network; and a control unit that generates a message in accordance with a mental condition of the partner user and the relationship between the user and the partner user, and sends the message from the virtual agent to the partner user.

(2)

The information processing system according to (1), in which the control unit sends the message to the partner user, and also sends the 110 message to the user.

(3)

The information processing system according to (1) or (2), in which the control unit automatically generates a message from a tendency of a message received and sent in past between the user and the partner user with the mental condition of the partner user.

(4)

The information processing system according to (1) or (2), in which the control unit automatically generates a message from a tendency of a message received and sent from and to another user with a same relationship as the relationship between the user and the partner user.

(5)

The information processing system according to any one of (1) to (4), in which the control unit sets whether or not it is permitted that the user automatically sends a message from the virtual agent to the partner user in accordance with setting input via a specific user interface.

(6)

The information processing system according to any one of (1) to (5), in which the control unit determines whether or not permission is obtained from the user before sending a message to the partner user in accordance with setting input via a specific user interface.

(7)

The information processing system according to any one of (1) to (6), in which the control unit sets whether or not a message from the user or a message from the virtual agent is displayed to be capable of discrimination in accordance with setting input via a specific user interface.

(8)

The information processing system according to any one of (1) to (7), in which the control unit sets whether or not it is permitted that the user automatically sends a message to the partner user from the virtual agent for every mental condition of the partner user in accordance with setting input via a specific user interface.

(9)

The information processing system according to any one of (1) to (8), in which the control unit sets whether or not it is permitted that the user automatically sends a message to the partner user from the virtual agent depending on a time slot in accordance with setting input via a specific user interface.

(10)

The information processing system according to any one of (1) to (9), in which the control unit edits the generated message in response to a request of the user.

(11)

An information processing method including, by a processor:

generating a message in accordance with a mental condition of a partner user as a communication partner on a network and a relationship between a user for which a virtual agent is substituted and the partner user, is the relationship being accumulated in a database; and sending the message from the virtual agent to the partner user.

REFERENCE SIGNS LIST 1 server
10 control unit
101 message generating unit
102 presentation control unit
103 notification control unit
104 setting unit
11 communication unit
12 relational information DB
13 response DB
2 information processing device
3 wearable terminal
4 network

The invention claimed is:

1. An information processing system, comprising:
a database configured to store a relationship between a first user and a second user, the first user being associated with a virtual agent in a server, the virtual agent serving as a substitute user of the first user;
a sensor configured to sense an emotion or a mental condition of the second user; and
the server including processing circuitry configured to
automatically generate a message when the sensor senses the emotion or the mental condition of the second user based on the emotion or the mental condition of the second user and the relationship between the first user and the second user, and
send the message from the virtual agent to the second user.

2. The information processing system according to claim 1, wherein
the processing circuitry is further configured to send the message to the first user.

3. The information processing system according to claim 1, wherein
the processing circuitry is further configured to automatically generate the message when the sensor senses the emotion or mental condition of the second user based on messages previously sent to the second user.

4. The information processing system according to claim 1, wherein
the processing circuitry is further configured to automatically generate the message based on messages sent from the first user to a third user, and
a relationship between the first user and the third user is the same as the relationship between the first user and the second user.

5. The information processing system according to claim 1, wherein
the processing circuitry is further configured to set whether the server is permitted to automatically send the message from the virtual agent to the second user in accordance with an input via a specific user interface.

6. The information processing system according to claim 1, wherein
the processing circuitry is further configured to determine whether permission is obtained from the first user in accordance with an input via a specific user interface before sending the message to the second user.

7. The information processing system according to claim 1, wherein
the processing circuitry is further configured to set whether the message sent from the virtual agent is displayed differently from a message sent from the first user.

8. The information processing system according to claim 1, wherein
the processing circuitry is further configured to determine whether the server is permitted to automatically send the message to the second user from the virtual agent depending on a time slot set via a specific user interface.

9. The information processing system according to claim 1, wherein
the processing circuitry is further configured to edit the generated message in response to a request of the first user.

10. An information processing method, comprising:
sensing, by a sensor, an emotion or a mental condition of a second user;
automatically generating, by a server, a message when the sensor senses the emotion or the mental condition of the second user based on the emotion or the mental condition of the second user and a relationship between a first user and the second user; and
sending the message from a virtual agent in the server to the second user, wherein
the relationship between the first user and the second user is stored in database, and
the first user is associated with the virtual agent serving as a substitute user of the first user.

11. The method of claim 10, further comprising:
sending, by the server, the message to the first user.

12. The method of claim 10, wherein the automatically generating further comprises:
automatically generating the message when the sensor senses the emotion or mental condition of the second user based on messages previously sent to the second user.

13. The method of claim 10, wherein the automatically generating further comprises:
automatically generating the message based on messages from the first user to a third user, a relationship between the first user and the third user being the same as the relationship between the first user and the second user.

14. The method of claim 10, further comprising:
setting whether the server is permitted to automatically send the message from the virtual agent to the second user in accordance with an input via a specific user interface.

15. The method of claim 10, further comprising:
determining whether permission is obtained from the first user in accordance with an input via a specific user interface before sending the message to the second user.

16. The method of claim 10, further comprising:
setting whether the message sent from the virtual agent is displayed differently from a message sent from the first user.

17. The method of claim 10, further comprising:
determining whether the server is permitted to automatically send the message to the second user from the virtual agent depending on a time slot set via a specific user interface.

18. The method of claim 10, further comprising:
editing the generated message in response to a request of the first user.

* * * * *